US009354662B2

(12) United States Patent
Ohishi et al.

(10) Patent No.: US 9,354,662 B2
(45) Date of Patent: May 31, 2016

(54) ELECTRONIC APPARATUS AND COMPONENT FOR ELECTRONIC APPARATUS

(71) Applicant: FUJITSU LIMITED, Kawasaki-shi, Kanagawa (JP)

(72) Inventors: Shintaro Ohishi, Kawasaki (JP); Shinji Aoki, Kawasaki (JP); Masuo Ohnishi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/213,067

(22) Filed: Mar. 14, 2014

(65) Prior Publication Data
US 2014/0293528 A1    Oct. 2, 2014

(30) Foreign Application Priority Data

Mar. 29, 2013 (JP) ................................. 2013-074305

(51) Int. Cl.
G06F 1/16    (2006.01)
H01Q 1/24    (2006.01)
G02F 1/1333  (2006.01)

(52) U.S. Cl.
CPC ............ *G06F 1/1637* (2013.01); *G06F 1/1601* (2013.01); *G06F 1/1605* (2013.01); *G06F 1/1607* (2013.01)

(58) Field of Classification Search
CPC ... G06F 1/1605; G06F 1/1607; G06F 1/1601; G06F 1/1603; G06F 1/1637; G06F 1/1675; G06F 1/1686
USPC ............. 361/679.01–679.39, 679.55–679.59; 349/58–60; 343/702; 455/575.1, 575.8
See application file for complete search history.

(56) References Cited

U.S. PATENT DOCUMENTS

| 5,531,950 | A | 7/1996 | Kimura et al. | |
| 7,630,199 | B2 * | 12/2009 | Shigenobu | G06F 1/1616 257/778 |
| 8,432,674 | B2 * | 4/2013 | Shirasaka | G06F 1/1656 349/58 |
| 8,675,373 | B2 * | 3/2014 | Kinjou | G06F 1/1698 361/679.01 |

(Continued)

FOREIGN PATENT DOCUMENTS

| JP | 03-183516 A | 8/1991 |
| JP | 07-124995 A | 5/1995 |

OTHER PUBLICATIONS

Panasonic "Letsnote", https://panasonic.jp/pc/supportlproducts/r9j/tough.html, 2010, W/Partial English Translation.

*Primary Examiner* — Nidhi Thaker

(74) *Attorney, Agent, or Firm* — Westerman, Hattori, Daniels & Adrian, LLP

(57) ABSTRACT

An electronic apparatus includes a first casing component that is provided with a through hole and made of metal, a second casing component that is integrally molded with the first casing component and made of resin, and a third casing component that covers the second casing component, wherein the second casing component is provided so as to extend from a face on one side of the through hole of the first casing component to a face on the other side of the first casing component through the through hole. The second casing component includes a fixing portion that fixes the second casing component to the first casing component, and a rib that is provided so as to stand over the first casing component in a position away from the through hole, and the third casing component being supported by the rib.

12 Claims, 11 Drawing Sheets

(56) References Cited

U.S. PATENT DOCUMENTS

| | | | | |
|---|---|---|---|---|
| 2002/0118136 A1* | 8/2002 | Gushiken | G06F 1/1616 | 343/702 |
| 2003/0198009 A1* | 10/2003 | Homer | G06F 1/1616 | 361/679.27 |
| 2004/0183732 A1* | 9/2004 | Konishi | G06F 1/1616 | 343/702 |
| 2004/0239569 A1* | 12/2004 | Park | H01Q 21/28 | 343/702 |
| 2007/0293005 A1* | 12/2007 | Shigenobu | G06F 1/1616 | 438/238 |
| 2009/0059490 A1* | 3/2009 | Oogami | G06F 1/1616 | 361/679.55 |
| 2011/0013347 A1* | 1/2011 | Kinjou | G06F 1/1616 | 361/679.01 |
| 2011/0222220 A1* | 9/2011 | Murakata | G06F 1/1601 | 361/679.01 |
| 2012/0039058 A1* | 2/2012 | Kinjou | G06F 1/1698 | 361/807 |

* cited by examiner

ELECTRONIC APPARATUS AND COMPONENT FOR ELECTRONIC APPARATUS

CROSS-REFERENCE TO RELATED APPLICATION

This application is based upon and claims the benefit of priority of the prior Japanese Patent Application No. 2013-074305, filed on Mar. 29, 2013, the entire contents of which are incorporated herein by reference.

FIELD

The embodiment discussed herein is related to an electronic apparatus and a component for the electronic apparatus.

BACKGROUND

In an electronic apparatus, such as a personal computer, a component into which metal and a resin-molded body are integrated may be used as part of a casing. The resin-molded body may be provided with a rib to gain structural strength. A structure is suggested in which when metal and a resin-molded body are integrated, resin is poured through a through hole provided to the metal and a rib is provided immediately over the through hole.

Japanese Laid-open Patent Publication No. 3-183516 and Japanese Laid-open Patent Publication No. 7-124995 are examples of related art.

SUMMARY

According to an aspect of the invention, an electronic apparatus a first casing component that is provided with a through hole and made of metal, a second casing component that is integrally molded with the first casing component and made of resin, and a third casing component that covers the second casing component, wherein the second casing component is provided so as to extend from a face on one side of the through hole of the first casing component to a face on the other side of the first casing component through the through hole, the second casing component includes, a fixing portion that fixes the second casing component to the first casing component, and a rib that is provided so as to stand over the first casing component in a position away from the through hole, and the third casing component being supported by the rib.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

When a rib is provided immediately over a through hole into which resin is poured as described in the Background, a sink mark may be caused in a portion opposite the rib of a resin-molded body. Accordingly, it is preferable to provide an electronic apparatus including a casing component into which a resin-molded body and metal are integrated, which is structured so that occurrence of a sink mark may be suppressed while forming a rib.

A preferred embodiment of the techniques disclosed by the present application is now described with reference to the drawings.

Figure 1:
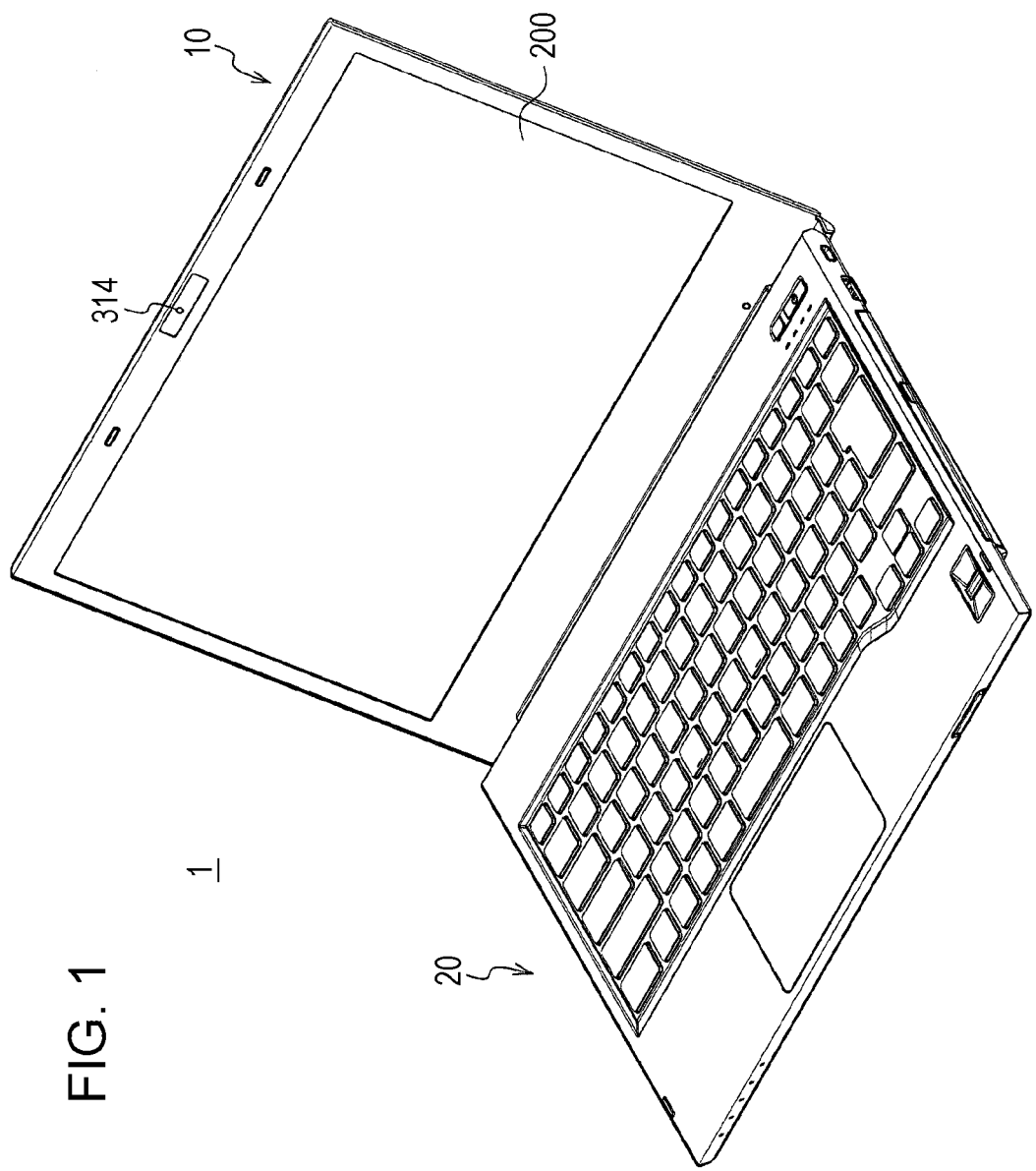
FIG. 1 is a schematic perspective view for explaining a personal computer according to an embodiment.

As illustrated in FIG. 1, a personal computer 1 according to the preferred embodiment is a notebook-type personal computer, which includes a personal computer main unit 20 and a display unit 10. The personal computer 1 is an example of an electronic apparatus.

Figure 2:
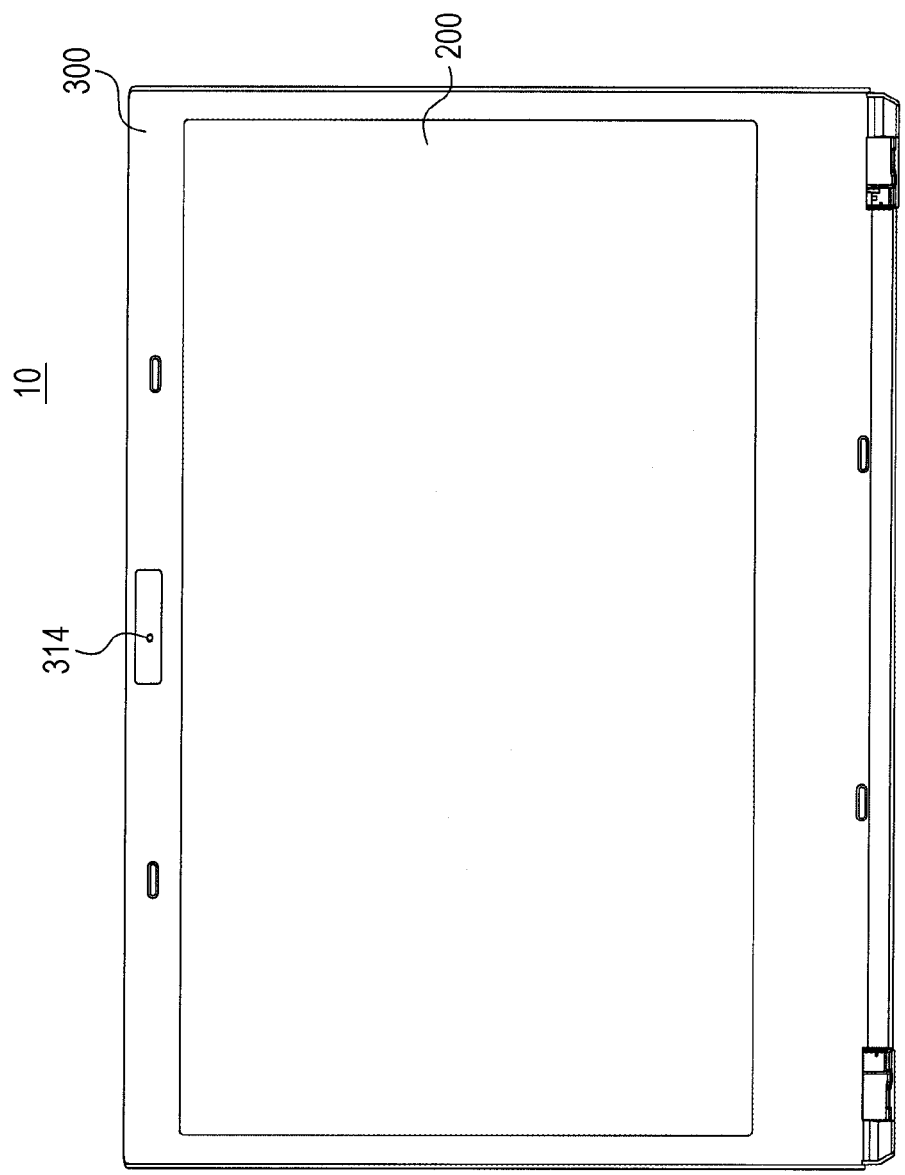
FIG. 2 is a schematic front view for explaining a liquid crystal unit of the personal computer according to the embodiment.
Figure 3:
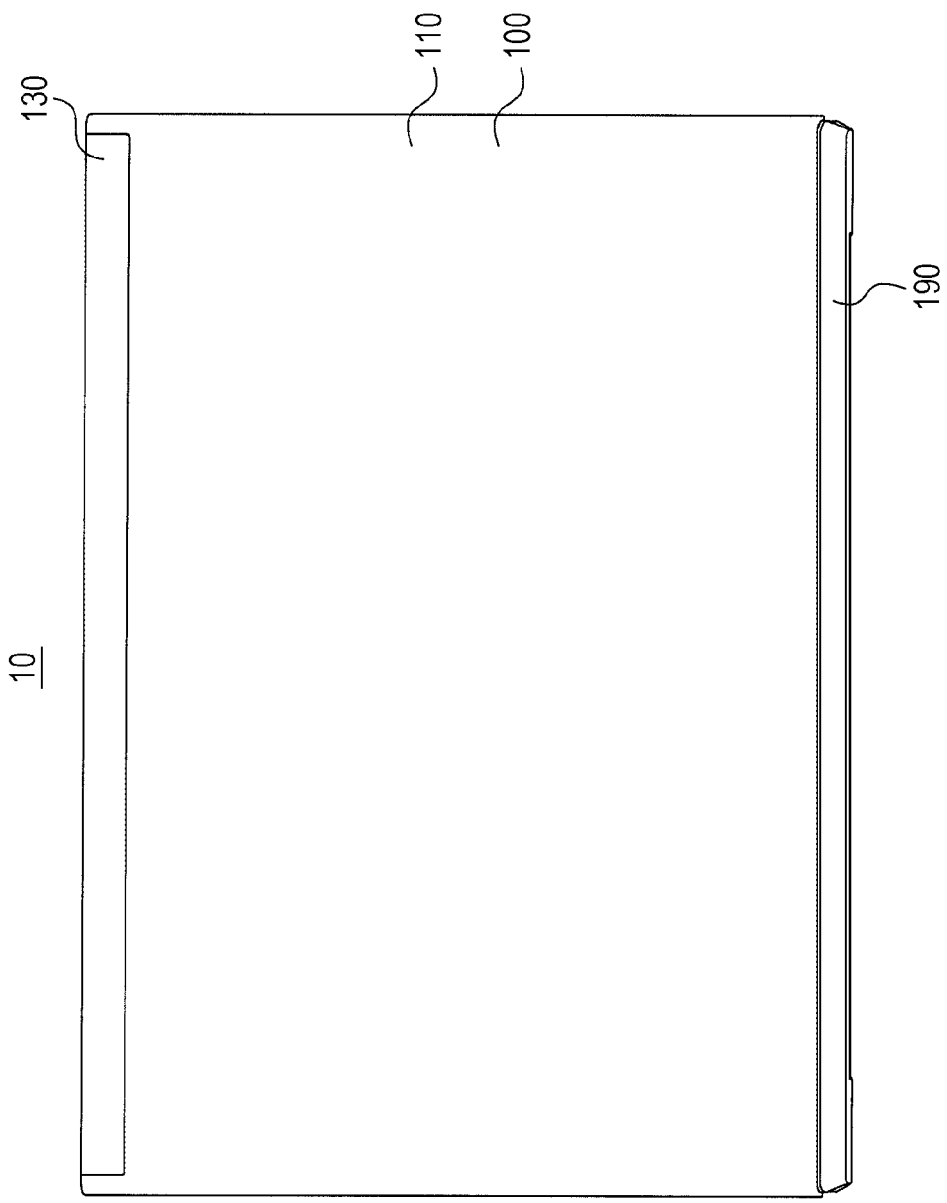
FIG. 3 is a schematic rear view for explaining the liquid crystal unit of the personal computer according to the embodiment.
Figure 4:
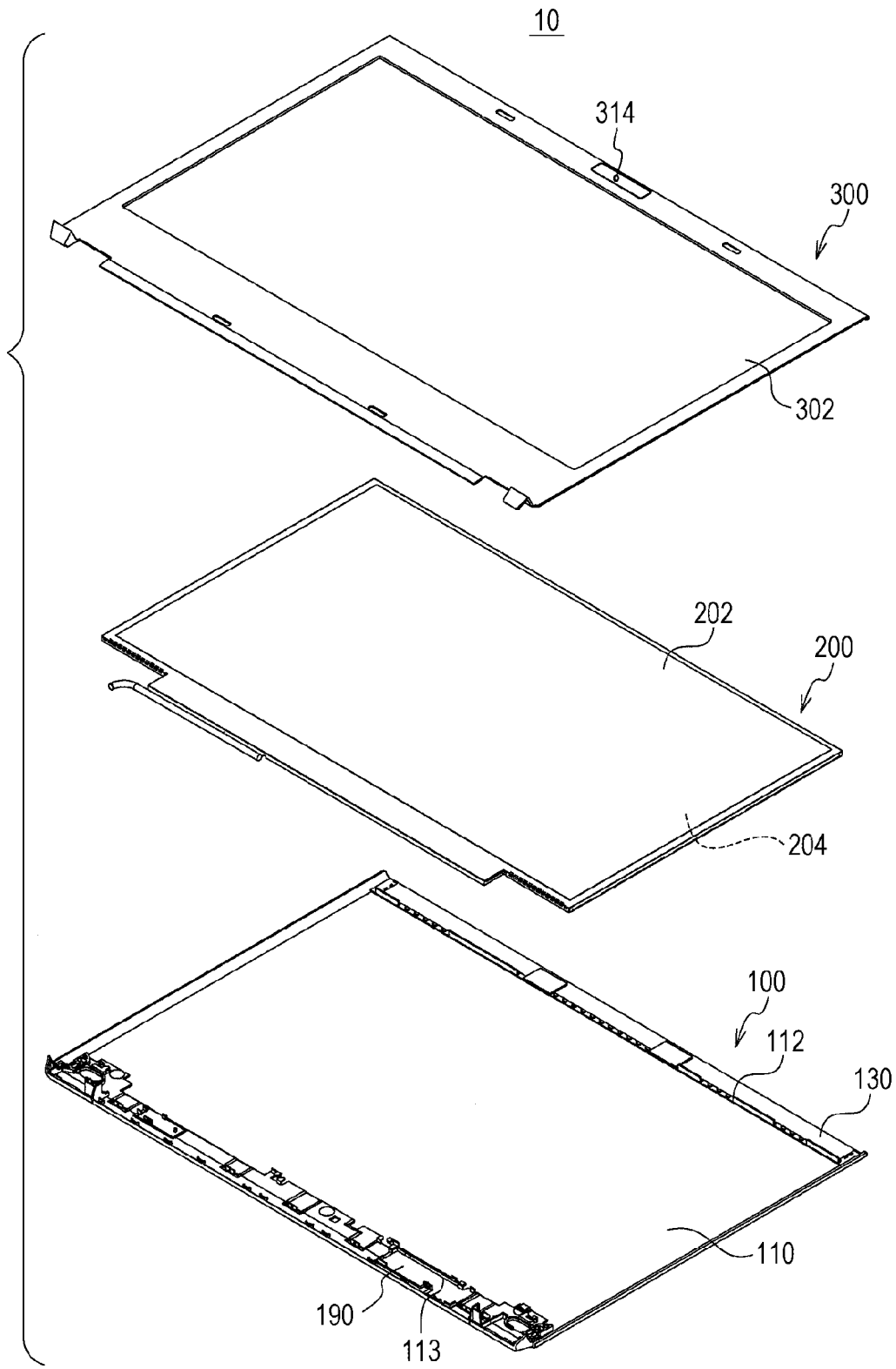
FIG. 4 is a schematic exploded perspective view for explaining the liquid crystal unit of the personal computer according to the embodiment.

As illustrated in FIGS. 2 to 4, the display unit 10 includes a liquid crystal display panel 200, a front cover 300, and a rear cover 100. The liquid crystal display panel 200 is an example of an electronic element. The front cover 300 is provided with an opening 302. The front cover 300 covers the periphery of a liquid crystal display portion 202 of the liquid crystal display panel 200, and allows the liquid crystal display portion 202 to be exposed through the opening 302 of the front cover 300. The front cover 300 is made of resin. The rear cover 100 covers a back face 204 on the side opposite the liquid crystal display portion 202 of the liquid crystal display panel 200.

Figure 5:
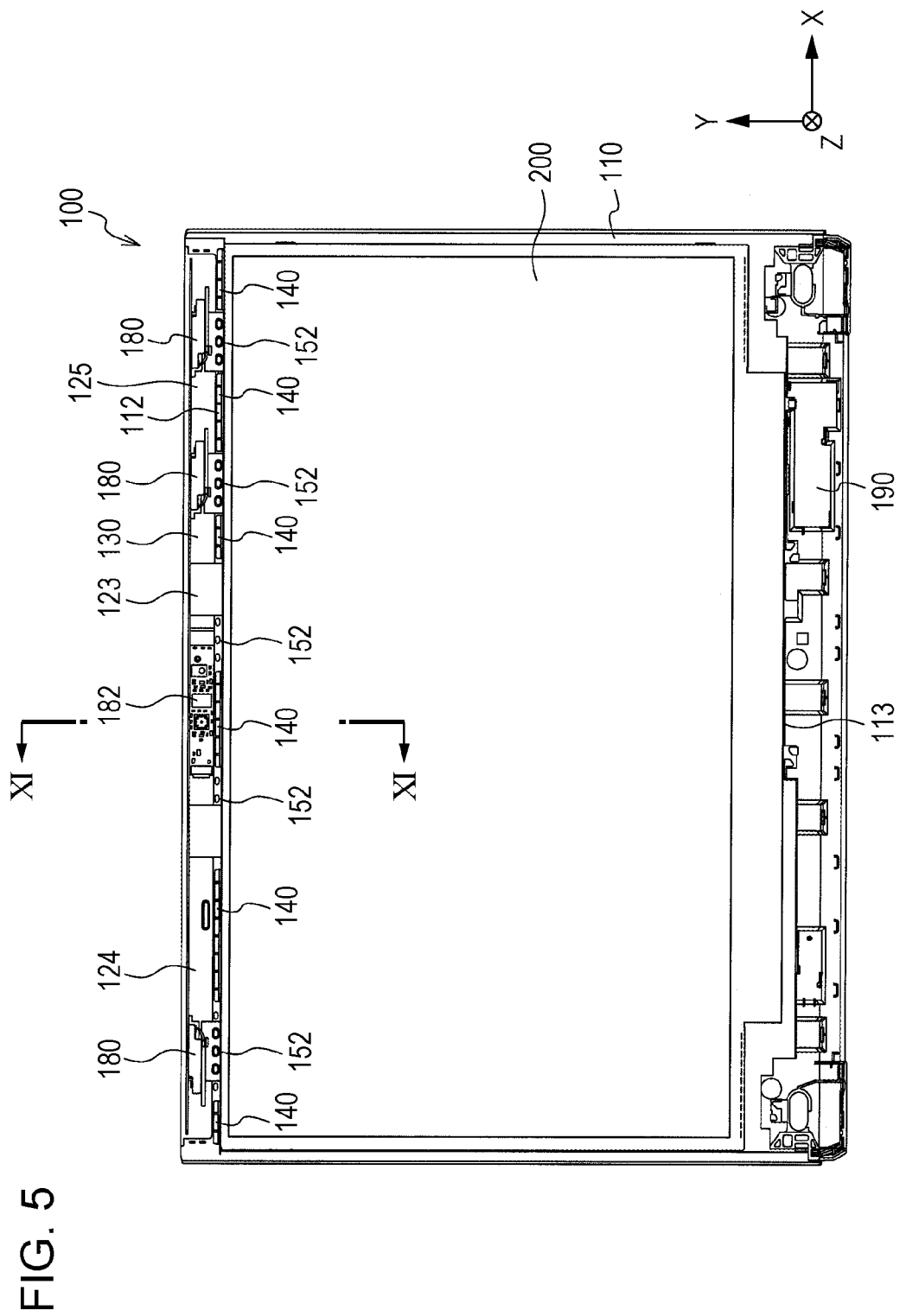
FIG. 5 is a schematic plan view for explaining arrangement of a rear cover, an antenna, and a camera in the liquid crystal unit of the personal computer according to the embodiment.

As illustrated in FIGS. 4 and 5, the rear cover 100 includes a rear cover body 110, an antenna cover 130, and a rear cap 190. The rear cover body 110 is made of metal, for which a magnesium alloy or the like is preferably used. The antenna cover 130 and the rear cap 190 are made of resin. The liquid crystal display panel 200 is provided over the rear cover body 110. The rear cover body 110 is arranged in the center of the rear cover 100. The antenna cover 130 and the rear cap 190 are attached to two end portions 112 and 113 of the rear cover body 110, which face each other, respectively. A direction from the end portion 113 toward the end portion 112 is herein referred to as a "direction Y".

As illustrated in FIG. 5, a camera 182 is attached to a central portion 123 of the antenna cover 130. An antenna 180 is attached to each of side portions 124 and 125 of the antenna cover 130.

Figure 6:
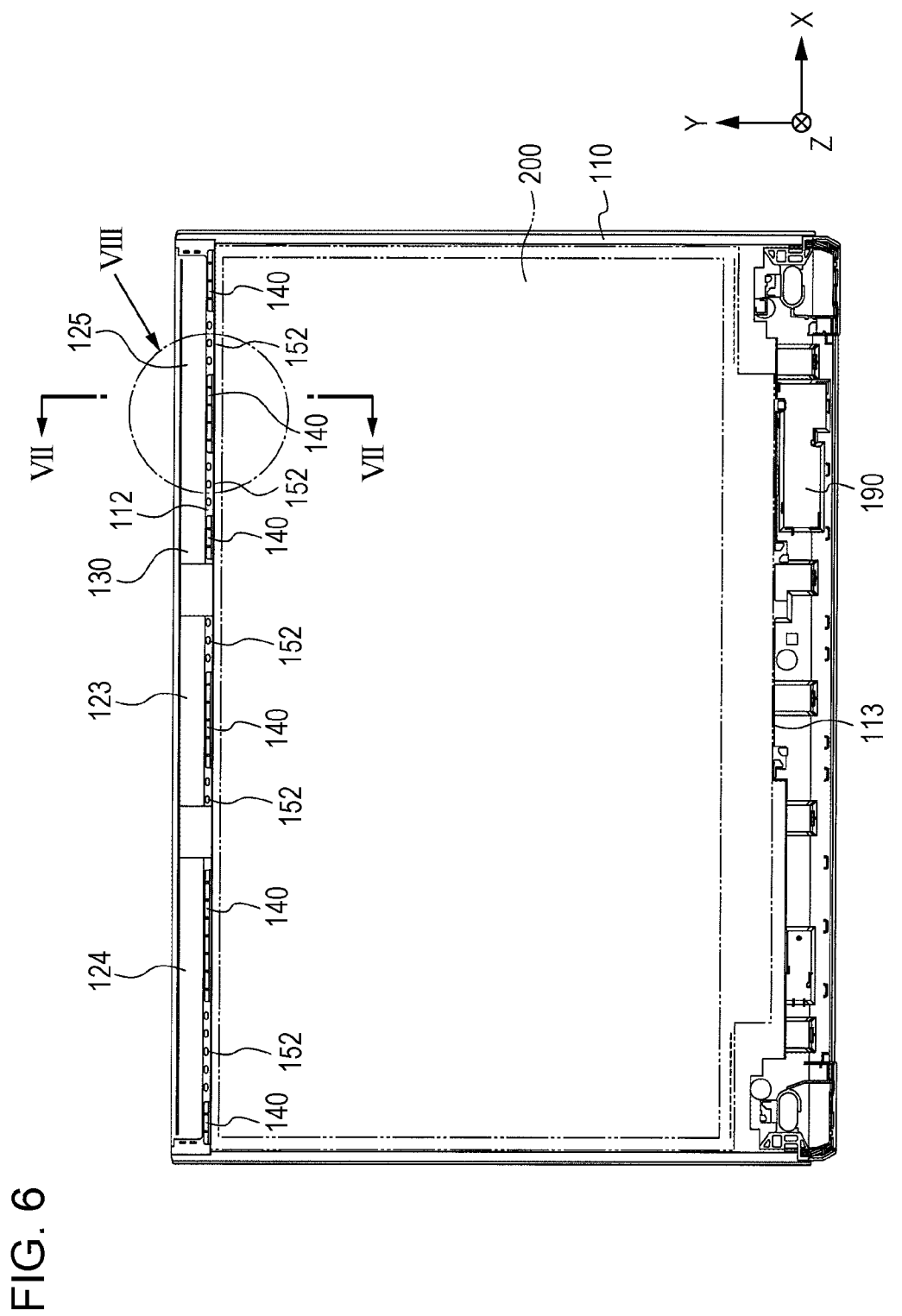
FIG. 6 is a schematic plan view for explaining the rear cover of the liquid crystal unit of the personal computer according to the embodiment.
Figure 7:
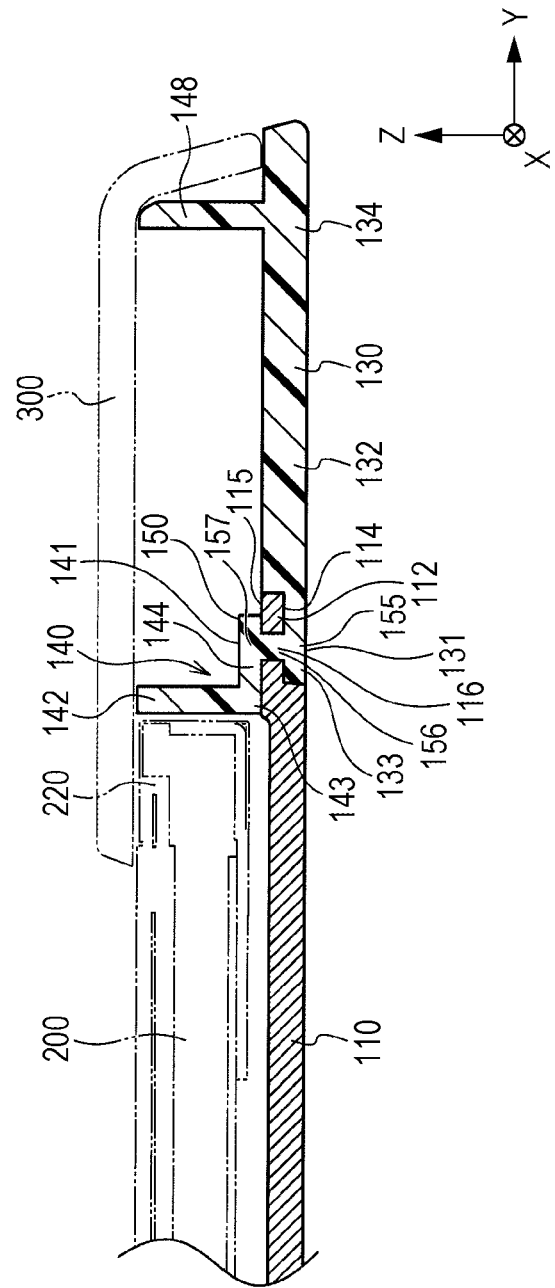
FIG. 7 is a schematic sectional view taken along line VII-VII of FIG. 6.
Figure 8:
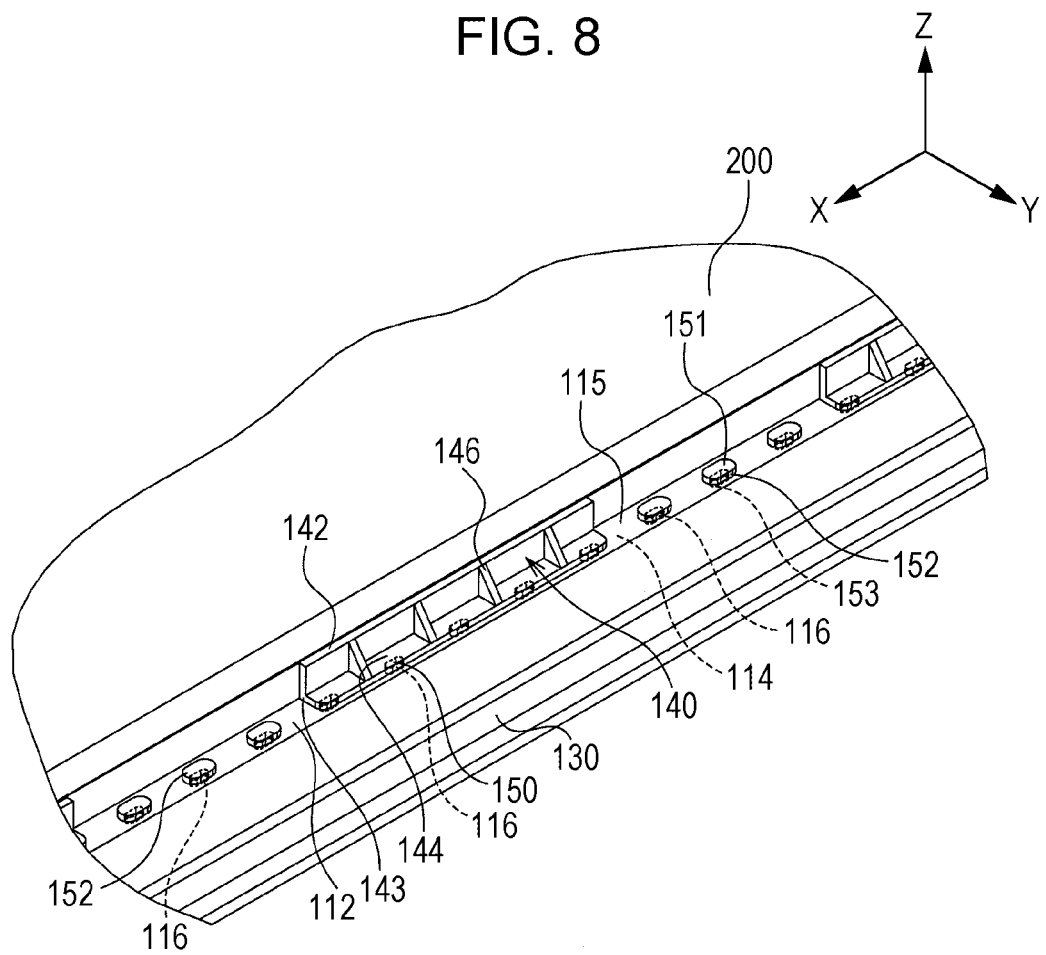
FIG. 8 is a schematic partial enlarged perspective view of portion VIII of FIG. 6.

As illustrated in FIGS. 6 to 8, the antenna cover 130 includes a base portion 132, an L-shaped rib 140, a rib 148, and an anchor 152. The base portion 132 is shaped like a flat plate. The L-shaped rib 140 is provided on the side of an end portion 133, which is at one end of the base portion 132 in the direction Y, and the rib 148 is provided on the side of an end portion 134, which is at the other end of the base portion 132 in the direction Y. The antenna cover 130 is attached to the end portion 112 of the rear cover body 110 with the L-shaped ribs 140 and the anchors 152. In a direction in which the end portion 112 of the rear cover body 110 extends, which is herein referred to as a direction X, the L-shaped ribs 140 are discretely provided. The plurality of anchors 152 are provided between each pair of the L-shaped ribs 140.

As illustrated in FIG. 8, a plurality of through holes 116 are provided to the end portion 112 of the rear cover body 110 in the direction in which the end portion 112 extends, that is, in the direction X. Each of the through holes 116 present among the L-shaped ribs 140 is provided with the anchor 152. The anchor 152 is provided so as to extend from the base portion 132 of the antenna cover 130, which is on the side of a lower face 114 of the end portion 112 of the rear cover body 110 (see FIG. 7), to an upper face 115 of the end portion 112 (see FIG. 7) through the through hole 116. The anchor 152 includes an anchor lower portion 153 on the lower side of the anchor 152, which has a cross-sectional area larger than the cross-sectional area of the through hole 116, and includes an anchor upper portion 151 on the upper side of the anchor 152, which has a cross-sectional area larger than the cross-sectional area of the through hole 116. The anchor lower portion 153 is part of the base portion 132.

As illustrated in FIGS. 7 and 8, the L-shaped rib 140 includes a flat plate portion 141 and a rib 142. The flat plate portion 141 is provided over the upper face 115 of the end portion 112 of the rear cover body 110. The rib 142 is provided to one end portion 143 of the flat plate portion 141 so as to stand over the upper face 115 of the end portion 112. The rib 142 is provided so as to be perpendicular to the flat plate portion 141. The cross section of the L-shaped rib 140 has an L-shape. The flat plate portion 141 is provided so as to cover the plurality of through holes 116. The L-shaped rib 140 is fixed by a fixing portion 150 to the end portion 112 of the rear cover body 110 through each of the through holes 116. The fixing portion 150 is provided so as to extend from the lower face 114 of the end portion 112 to the upper face 115 of the end portion 112 through the through hole 116. The fixing portion 150 includes a lower-side fixing portion 155, which is on the lower side of the lower face 114 of the end portion 112, an inside fixing portion 156, which is inside the through hole 116, and an upper-side fixing portion 157, which is on the upper side of the upper face 115 of the end portion 112. The lower-side fixing portion 155 is part of the base portion 132, and the upper-side fixing portion 157 is part of the flat plate portion 141. The cross-sectional area of the lower-side fixing portion 155 and the cross-sectional area of the upper-side fixing portion 157 are larger than the cross-sectional area of the through hole 116. The flat plate portion 141 includes a coupling portion 144 that couples the fixing portion 150 and the rib 142 together. The coupling portion 144 causes the cross-sectional L-shape to be formed from the fixing portion 150 to the rib 142. Strengthening ribs 146, which each have a triangle-shaped cross section, are provided between the rib 142 and the flat plate portion 141.

As illustrated in FIG. 7, the rib 142 of the L-shaped rib 140 and the rib 148 are provided to stand in a direction perpendicular to the base portion 132, which is herein referred to as a direction Z perpendicular to the above-described directions X and Y. The front cover 300 is supported by the ribs 142 and the ribs 148. The front cover 300 covers the antenna cover 130 and an upper end portion 220 of the liquid crystal display panel 200. The front cover 300 is provided to cover the camera 182 (see FIG. 5) and the antennas 180 (see FIG. 5).

A method of attaching the antenna cover 130 made of resin to the rear cover body 110 made of metal is now described with reference to FIGS. 9A to 9C.

Figure 9A:
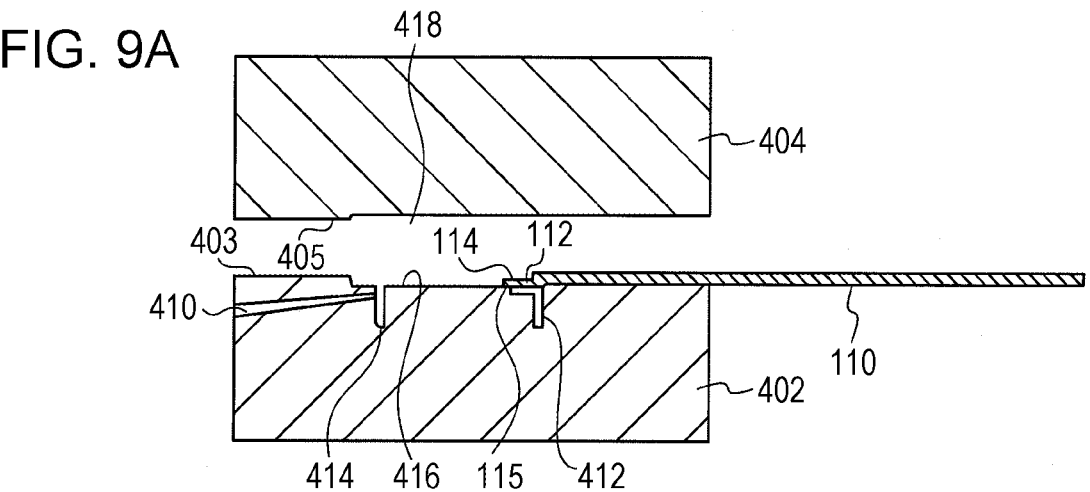
FIGS. 9A to 9C are schematic sectional views for explaining a method of manufacturing the rear cover of the liquid crystal unit of the personal computer according to the embodiment.
Figure 9B:
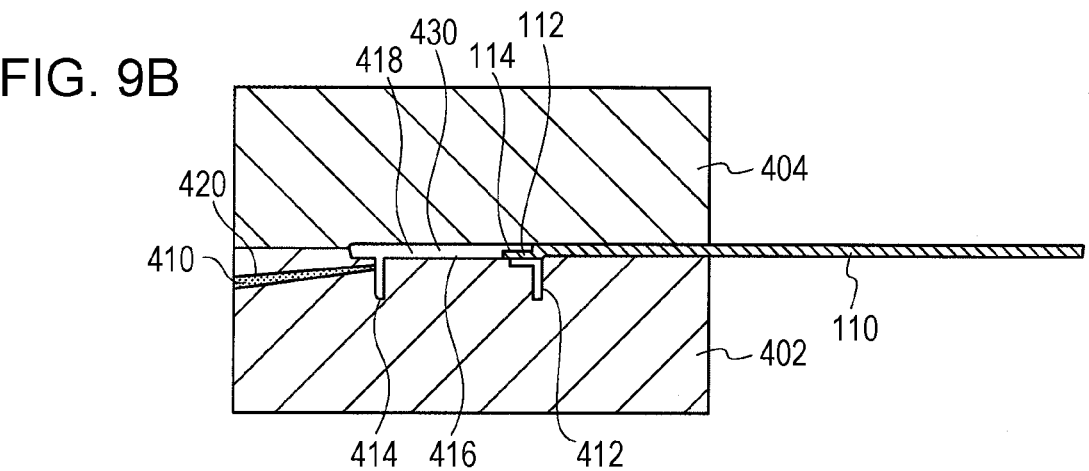
Figure 9C:
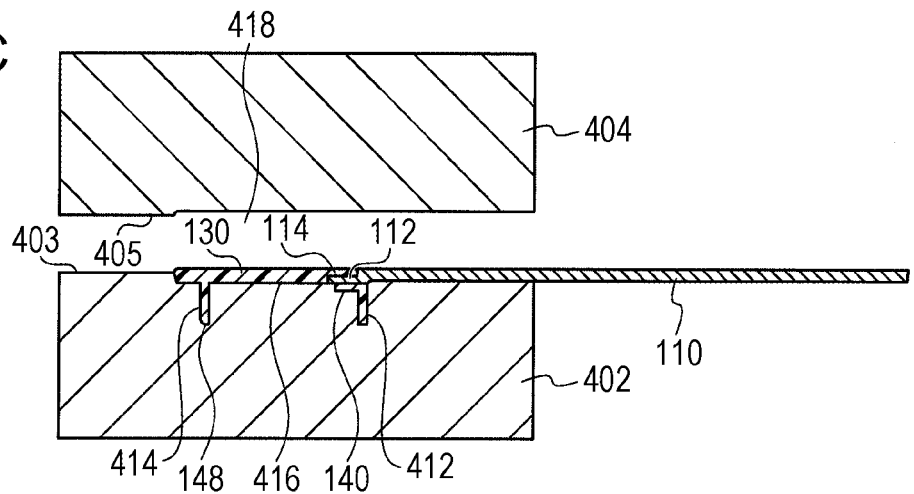

First, a die 402, which is on the side of a core, and a die 404, which is on the side of a cavity, are prepared (see FIG. 9A). On the side of a face 403, the die 402 includes a depressed portion 416, a depressed portion 414 that communicates with the depressed portion 416, and a depressed portion 412 that has an L-shaped cross section. The die 402 further includes a gate 410 that communicates with the depressed portion 414. On the side of a face 405, the die 404 includes a depressed portion 418.

The rear cover body 110 is set over the face 403 of the die 402. At this time, the end portion 112 of the rear cover body 110 is set so as to be in the depressed portion 416, and the upper face 115 of the end portion 112 is set so as to face the depressed portion 412.

After that, the face 403 of the die 402 and the face 405 of the die 404 are superposed over each other so that the depressed portions 412, 414, and 416 of the die 402, and the depressed portion 418 of the die 404 form a space 430. Resin 420 is poured from the gate 410 into the space 430 (see FIG. 9B), and the antenna cover 130 is integrally molded with the rear cover body 110 (see FIG. 9C). At this time, the resin 420 is poured into the depressed portion 412 from the side of the lower face 114 of the end portion 112 of the rear cover body 110 through the through hole 116 (see FIG. 7) to form the L-shaped rib 140. After that, the dies 404 and 402 are separated from each other and the antenna cover 130 integrally molded with the rear cover body 110 is separated from the die 402.

According to the present embodiment, the most part of the rear cover 100 is the rear cover body 110 made of metal, so strength may be ensured even when the rear cover body 110 made of metal is thinned. As a result, the rear cover 100 that is thin but strong may be achieved while the display unit 10 is thinned.

Since part of the rear cover 100 is the antenna cover 130, and the antenna cover 130 is made of resin and allows passage of radio waves, an antenna may be installed in the antenna cover 130.

The antenna cover 130 is fixed to the rear cover body 110 with the anchors 152 and the fixing portions 150 of the L-shaped ribs 140, which are formed by pouring resin into the through holes 116 of the end portion 112 of the rear cover body 110. When the antenna cover 130 made of resin is integrally molded with the rear cover body 110 made of metal in this manner, the antenna cover 130 is firmly joined to the rear cover body 110.

The flat plate portion 141 of the L-shaped rib 140 is provided to cover the plurality of through holes 116, and couples the plurality of fixing portions 150 that are respectively provided to the plurality of through holes 116. As a result, the strength of the fixing portion 150 itself may be enhanced and the joint ability of the antenna cover 130 and the rear cover body 110 may be increased.

In the L-shaped rib 140, the rib 142 is provided so as to stand over the end portion 143 of the flat plate portion 141.

The ribs 142 support the front cover 300. Since the front cover 300 covers the upper end portion 220 of the liquid crystal display panel 200, when the strength of the front cover 300 is insufficient, load caused by the front cover 300 may be applied to the liquid crystal display panel 200. However, in the present structure, since the ribs 142 support the front cover 300, the strength of the front cover 300 may be enhanced and the load caused by the front cover 300 may be unlikely to be applied to the liquid crystal display panel 200. As illustrated in FIGS. 7 and 8, the end portion 143 of the flat plate portion 141 over which the rib 142 is provided so as to stand is near the liquid crystal display panel 200. Accordingly, in the present structure, the degree of contribution of the ribs 142 to enhancing the strength of the front cover 300 may increase and the load caused by the front cover 300 may be more unlikely to be applied to the liquid crystal display panel 200. Further, the ribs 142 may be used for positioning the liquid crystal display panel 200.

In molding the antenna cover 130, resin is poured from the side of the lower face 114 of the end portion 112 of the rear cover body 110 through the through hole 116 (see FIG. 7) to form the L-shaped rib 140. Since the rib 142 is provided not immediately over the through hole 116 but is provided so as to stand over the end portion 143 away from the through holes 116, it may be avoided or suppressed to cause a sink mark in a portion 131 immediately below the through hole 116 during the molding. Accordingly, the appearance of the antenna cover 130 may be made desirable. Since the thickness of the rib 148 provided on the side of the end portion 134 is smaller than the thickness of the base portion 132, no sink mark is caused in a portion immediately below the rib 148 during the molding.

Figure 11:
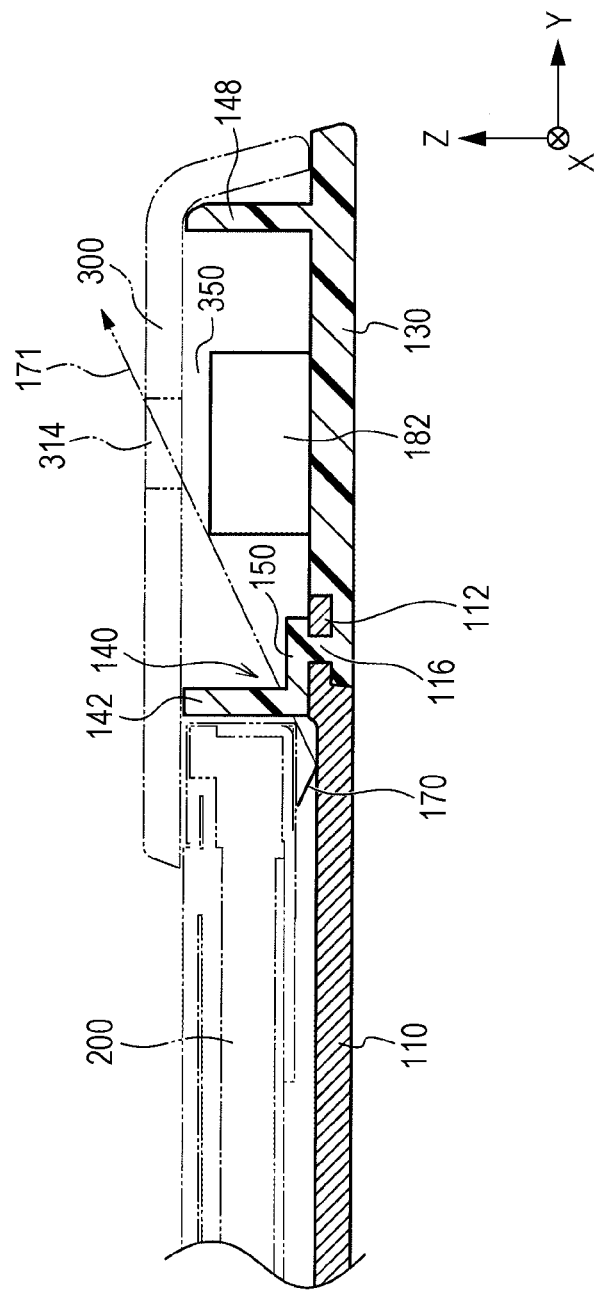
FIG. 11 is a schematic sectional view taken along line XI-XI of FIG. 5.

The camera 182 is attached to the central portion 123 of the antenna cover 130 (see FIGS. 5 and 11), and the front cover 300 is provided with an opening 314 that corresponds to a lens of the camera 182 (see FIG. 11). A gap 350 is present between the camera 182 and the front cover 300, which is caused by a deviation during the assembly, a tolerance of the molding, or the like. Since the rear cover body 110 is made of metal, back light 170 of the liquid crystal display panel 200 may be reflected by the rear cover body 110 and reflected light 171 may leak out of the opening 314 through the gap 350. Since the rib 142 is provided between the liquid crystal display panel 200 and the opening 314 while blocking the reflected light 171, the leakage of the reflected light 171 through the opening 314 may be avoided or suppressed. As a result, the appearance in operating the liquid crystal display panel 200 may be made desirable.

Figure 10:
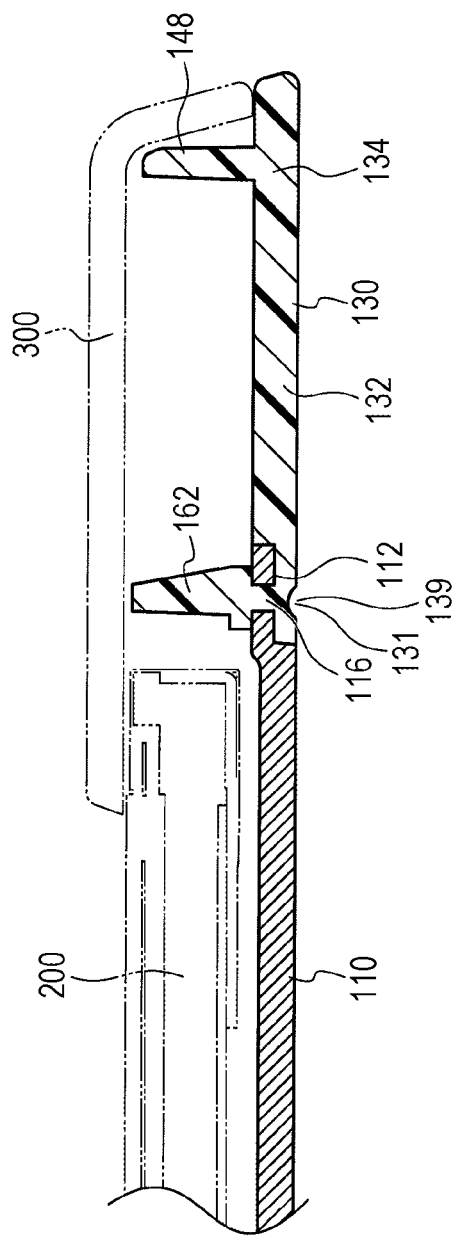
FIG. 10 is a schematic sectional view for explaining a rear cover of a liquid crystal unit of a personal computer for comparison.

With reference to FIG. 10, a case in which a rib 162 is formed immediately over the through hole 116 of the end portion 112 of the rear cover body 110 is described for comparison with the above-described embodiment. If the rib 162 is formed immediately over the through hole 116, in pouring resin to mold the rib 162, a sink mark 139 is caused in the portion 131 immediately below the through hole 116 and the appearance of the antenna cover 130 may become poor. Since the thickness of the rib 162 is almost the same as the thickness of the base portion 132, the sink mark 139 is caused. However, since the thickness of the rib 148 provided on the side of the end portion 134 is smaller than the thickness of the base portion 132, no sink mark is caused in the portion immediately below the rib 148 during the molding. Since the distance between the rib 162 and the liquid crystal display panel 200 is large, it may also be difficult to use the rib 162 for positioning the liquid crystal display panel 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic apparatus comprising:
    a first casing component that is provided with a through hole and made of metal;
    a second casing component that is integrally molded with the first casing component and made of resin; and
    a third casing component that covers the second casing component,
    wherein the second casing component is provided so as to extend from a face on one side of the through hole of the first casing component to a face on the other side of the first casing component through the through hole, the second casing component includes,
    a fixing portion that fixes the second casing component to the first casing component, and
    a rib that is provided so as to stand over the first casing component in a position away from the through hole, and
    the third casing component being supported by the rib.

2. The electronic apparatus according to claim 1, wherein the second casing component further includes a coupling portion which is provided over the face on the other side of the first casing component and couples the fixing portion and the rib together, and the fixing portion, the rib and the coupling portion forms a cross-sectional L-shape.

3. The electronic apparatus according to claim 1, wherein an electronic element is provided over the first casing component, and the rib is provided to be closer to the electronic element than the through hole is.

4. The electronic apparatus according to claim 1, wherein an electronic element is provided over the first casing component, and the rib is used for positioning the electronic element.

5. The electronic apparatus according to claim 1, wherein the first casing component is provided so as to extend in a first direction with respect to the fixing portion,
    the second casing component is provided to extend in a second direction opposite to the first direction with respect to the fixing portion, and
    the rib is provided on a side in the first direction with respect to the fixing portion.

6. The electronic apparatus according to claim 5, wherein the first casing component, the second casing component, and the rib extend in a third direction perpendicular to the first direction and the second direction, and
    a plurality of through holes and a plurality of fixing portions are provided in the third direction, each of a plurality of through holes being the through hole and each of a plurality of fixing portions being the fixing portion.

7. The electronic apparatus according to claim 1, wherein an electronic element is provided over the first casing component,
    the rib is provided so as to be closer to the electronic element than the through hole, and
    the third casing component covers part of the electronic element.

8. The electronic apparatus according to claim 1, wherein
the first casing component is provided with a display element,
the second casing component is provided with an imaging element,
the rib is provided between the display element and the imaging element, and
the third casing component is provided with an opening for the imaging element to perform imaging.

9. The electronic apparatus according to claim 1, wherein the third casing component is made of resin.

10. An electronic apparatus comprising:
a first casing component that is provided with a through hole and made of metal; and
a second casing component that is integrally molded with the first casing component and made of resin, the second casing component being provided so as to extend from a face on one side of the through hole of the first casing component to a face on the other side of the first casing component through the through hole, the second casing component includes,
a fixing portion that fixes the second casing component to the first casing component, and
a rib that is provided so as to stand over the first casing component in a position away from the through hole;
wherein the second casing component further includes a coupling portion which is provided over the face on the other side of the first casing component and couples the fixing portion and the rib together, and the fixing portion and the rib forms a cross-sectional L-shape.

11. The electronic apparatus component according to claim 10, further comprising a third casing component, the third casing component covering the second casing component and being supported by the rib.

12. The electronic apparatus component according to claim 11, wherein the third casing component is made of resin.

* * * * *